Figure 1:
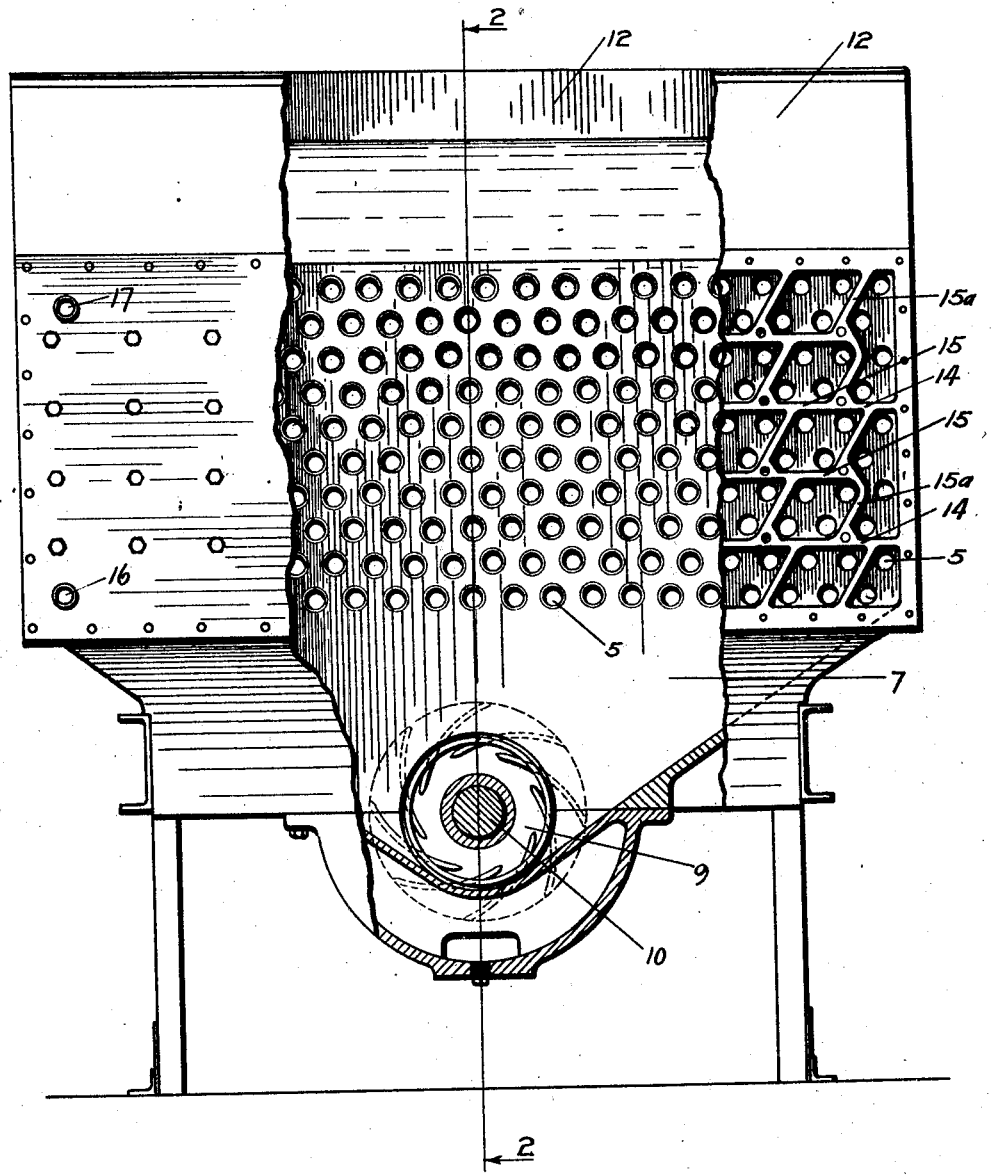

July 27, 1926. 1,593,782
R. W. SHAFOR ET AL
PROCESS AND APPARATUS FOR PRODUCING A REACTION OF LIME AND SUCROSE
IN THE MANUFACTURE OF SUGAR FROM SUGAR BEETS
Filed August 15, 1924 3 Sheets-Sheet 2
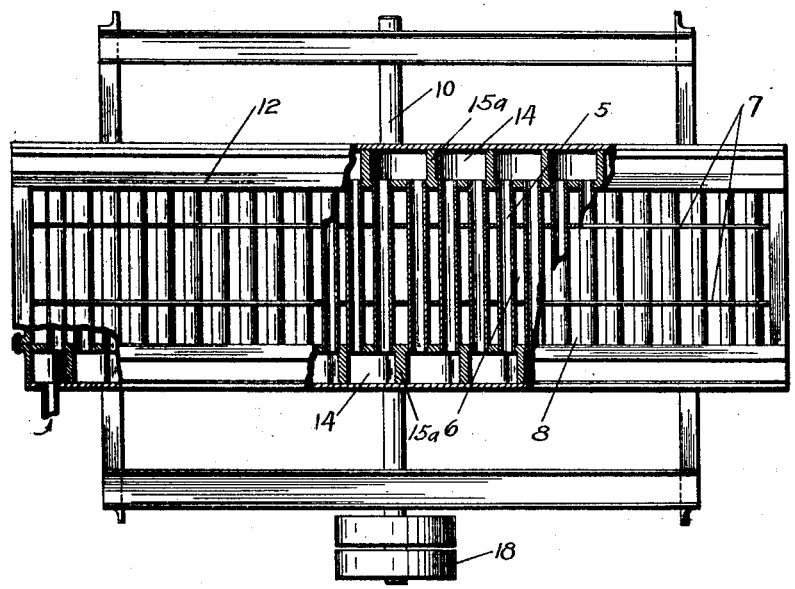
Fig. 3.
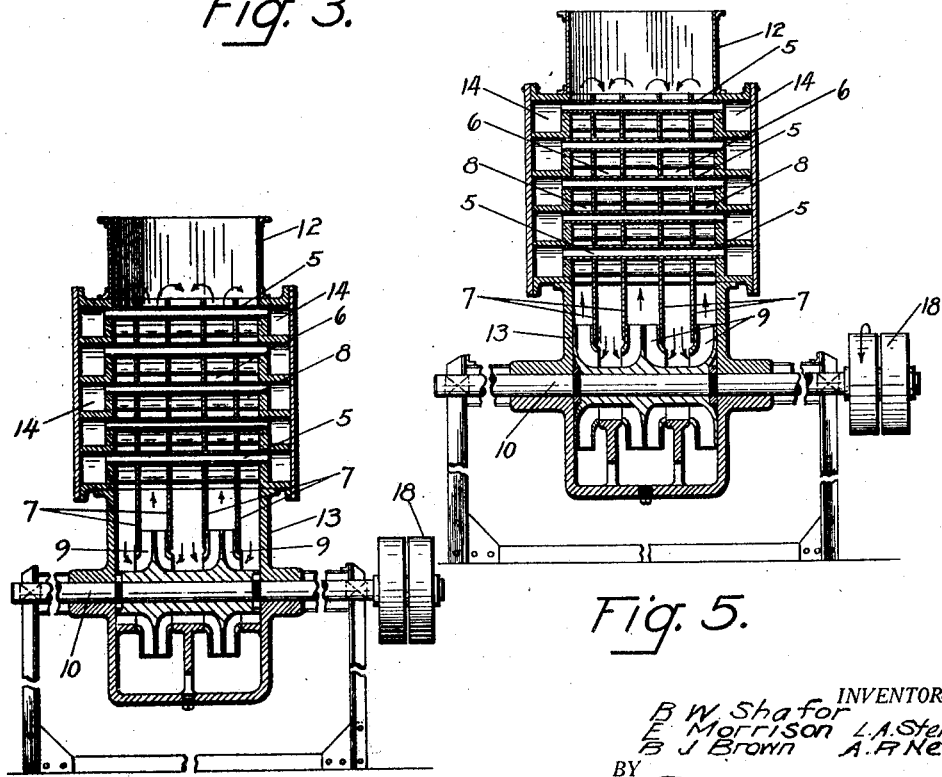
Fig. 4.
Fig. 5.
INVENTORS
B. W. Shafor
E. Morrison  L. A. Stenger
B. J. Brown  A. A. Nees
BY
ATTORNEY.

Patented July 27, 1926.

1,593,782

UNITED STATES PATENT OFFICE.

RALPH W. SHAFOR, EDWIN MORRISON, ROBERT J. BROWN, LAURENCE A. STENGER, AND ALPHEUS R. NEES, OF DENVER, COLORADO, ASSIGNORS TO THE GREAT WESTERN SUGAR COMPANY, OF DENVER, COLORADO, A CORPORATION OF NEW JERSEY.

PROCESS AND APPARATUS FOR PRODUCING A REACTION OF LIME AND SUCROSE IN THE MANUFACTURE OF SUGAR FROM SUGAR BEETS.

Application filed August 15, 1924. Serial No. 732,310.

This invention relates to a method and apparatus for producing a chemical reaction between sucrose and quicklime (CaO) in the process of recovering sugar from molasses residue, commonly known in the beet sugar industry as the Steffens process.

In the reaction occurring when the reagent (CaO) is added in suitable quantities to the diluted molasses in the course of the above stated process, it is obviously desirable that the reagent should function to its maximum capacity in the minimum of time, and it is an object of our invention to attain this desideratum by imparting to the material under treatment a circulatory movement which by frequently occurring changes of direction and a consequent pulsating velocity, causes a continuous displacement of the solid phase reagent relative to the solution phase.

The displacement of the powdered reagent prevents agglomeration of its particles and by maintaining the particles in separated condition and moving them continuously through the solution in search of unexhausted regions the maximum efficiency of the reagent resulting from a constant maximum effective area, is insured.

Another object of the invention is to prevent in the reaction process as hereinabove described, the formation of foam by the inclusion of air. The foam which if allowed to form, is usually of a very persistent nature, is detrimental in that it obstructs the passage of the reagent to the solution upon which it floats, in that it appears to assist agglomeration of the particles of the reagent, and in that it complicates the separation of the precipitate from the mother liquor subsequent to the reaction process, and its absence is therefore of value and of considerable importance.

Still another object of the invention resides in providing a novel method of circulating a cooling fluid through the material under treatment for the purpose of efficiently removing the heat evolved by the reaction, and further objects reside in details of construction and a novel arrangement of parts in the apparatus employed to carry our improved method of effecting the reaction between the lime and sucrose, into practice, as will fully appear in the course of the following description with reference to the accompanying drawings.

Figure 2:
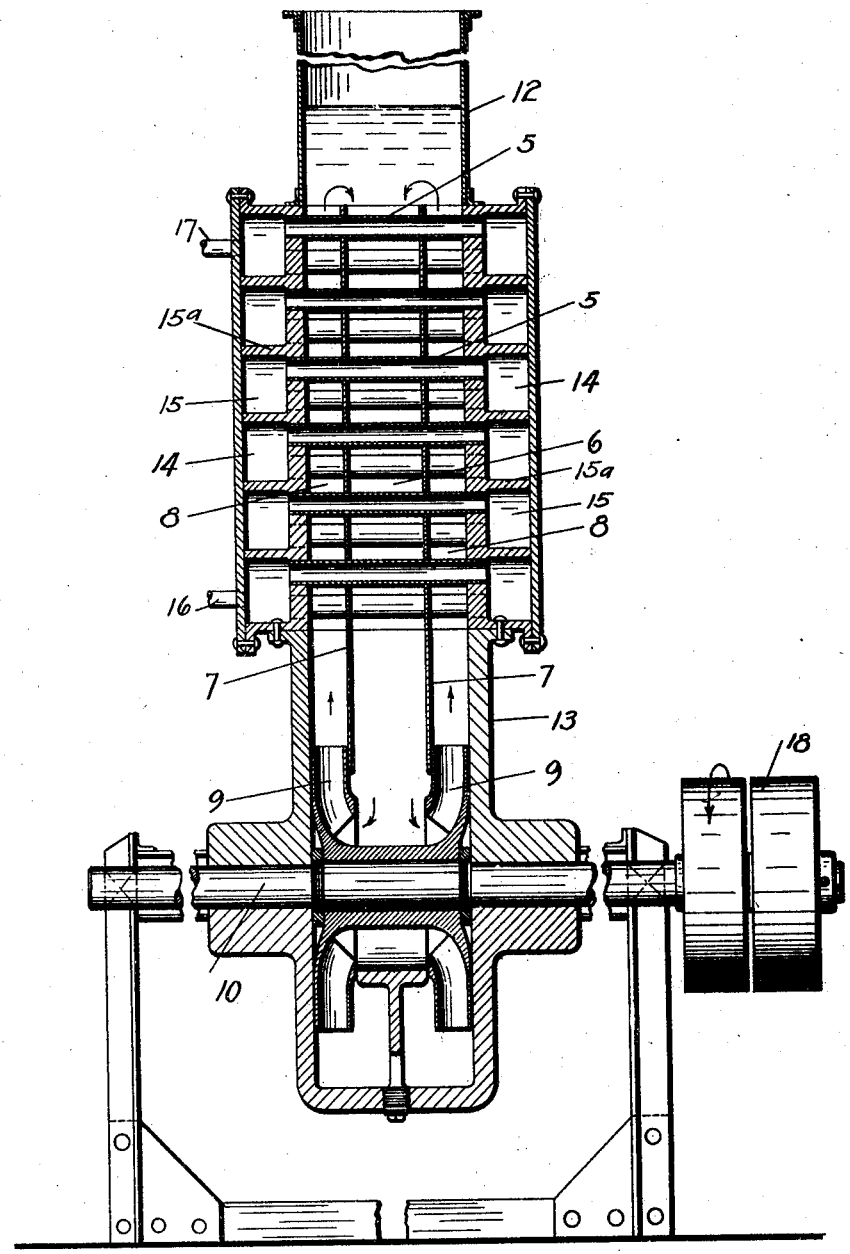

In the drawings in which like characters of reference designate corresponding parts throughout the several views, Figure 1 represents a partially sectional front elevation of the apparatus in its preferred form;

Figure 2, a vertical section taken on the line 2—2, Figure 1;

Figure 3, a sectional plan view of the apparatus drawn to reduced scale, and

Figures 4 and 5, sections in the plane of that shown in Figure 2, illustrating a method of increasing the capacity of the apparatus by multiplication of its units of circulative paths.

Referring in detail to the drawings, the apparatus comprises a bank of horizontal flues or refrigerant baffle 5 which are interconnected for the passage of a cooling fluid along a zig-zag course.

The flues extend transversely of a space 6 which constitutes the circulation chamber in which the reaction between the reagent and the sucrose in the solution is accomplished and which is divided by vertical partitions 7 to provide a path for the material in an upward and downward circulatory movement.

The outer compartments 8 of the circulation chamber connect at their lower ends with circumferential egress ports of rotary centrifugal pump impellers 9 which are mounted for conjoint operation upon a horizontal shaft 10. The chamber is at its upper end surmounted by a vertical extension 12 to provide for a liquid seal above the bank of flues, sufficiently high to prevent air from being drawn into the current of solution circulating around the flues under influence of the impellers.

The flues 5 extend between two upright side walls of a rectangular tank 13 which defines the circulation chamber mentioned hereinbefore, and they are interconnected for the circulation of the cooling fluid in a zig-zag course from one end of the bank to the other by narrow passageways 14 formed exteriorly of the side walls of the container 13 and divided into cells of honeycomb formation by longitudinal partitions 15 and transverse partitions 15a formed integral with each other and with the respective walls of the container.

The cells of the two passageways divide the flues into series of four and they are relatively arranged so that the fluid passing in one direction through the flues of one series must return in the opposite direction through the flues of an adjoining series, and so that in this manner, a fluid introduced at one end of the bank as at 16 in Figure 1, must traverse all the series of the bank in succession to find the point of discharge which in the construction shown in the drawings, is at a corner of the bank opposite to that at which the fluid enters, as shown at 17 in Figure 1.

In the operation of the apparatus, the tank or container 13 which encloses the centrifugal impellers, is filled to a level in the vertical extension above the bank of flues, with a "batch" of the molasses diluted with water until the resulting mixture contains approximately from 5 to 8% sucrose.

To this batch is added the powdered quicklime (CaO) ground so that approximately 98% will pass a standard 200 mesh screen.

The reagent is preferably added to the solution while the apparatus is in operation, at a definite measured rate throughout the reaction period whereby the reaction is uniformly conducted until the process is completed.

For example: If 1,000 pounds of lime were to be added to the quantity of solution under treatment and the reaction time were set to 20 minutes, the lime would be fed into the tank at a rate of approximately 50 pounds per minute.

The centrifugal pump impellers rotated by the connection of their shaft with a conveniently located motor through the medium of a pulley 18, initiate a rapid circulating movement of the mixture by forcing it upwardly in the outer compartments 8 of the circulation chamber.

After passing the upper ends of the partitions by which the compartments are defined, the mixture returns by gravity to the impellers through the central compartment whose area is approximately equal to the sum of those of the outer compartments.

During the circulating movement thus produced, the material passes through the spaces between the cooling flues 5 and by arranging the flues in alternately staggered rows as indicated in Figure 1, the circulating liquid is compelled to follow a zigzag course with numerous changes of direction and with a somewhat pulsating velocity.

As a result of this movement, the solution phase travels at a different rate than the solid phase reagent thereby causing a thorough intermixture of the two ingredients and a constant displacement of the lime particles in the solution, which together with the high velocity at which the mixture is impelled, results in a maximum reaction between the lime and the sucrose during a fixed period with a minimum quantity of reagent.

The head of liquid maintained in the extension 12 excludes air from the path of the circulating current of liquid across the bank of flues, and thereby prevents the formation of foam which as stated before, is detrimental to the reaction and hinders the subsequent separation of the precipitated substances from the mother liquor.

It will be understood in this connection, that in order to obtain the above stated advantage of the head of liquid in the extension, the current velocity in the reaction chamber must be regulated to limit the rate of gravitation movement of the solution in the central compartment, so as to avoid the inclusion of air with the liquid during its downward flow through said compartment.

The constant contact of the circulating mixture with the flues through which a cooling fluid is circulated in the manner hereinbefore described, removes the heat evolved by the reaction and by regulating the number of tubes in each series in accordance with the amount of cooling fluid supplied in a fixed time unit, any desired velocity may be maintained.

This is important in the operation of the apparatus since the efficiency of the cooling element varies directly with the velocity with which the cooling fluid circulates through the flues.

The apparatus as described hereinbefore, comprises a single circulation unit and it is to be understood that by multiplying these units the capacity of the apparatus may be increased to any desired extent. Thus, we have shown in Figures 4 and 5 two constructions in which by different arrangements of four impellers and the division of the reaction chamber into five compartments, four simultaneously moving currents are produced.

Having thus described our invention, it will be evident that its novel features, either separately or taken together, effect a material saving of time and labor with an equipment of combined simplicity and practicability, while the amount of reagent required to precipitate a unit weight of sucrose in the solution is materially reduced.

What we claim and desire to secure by Letters Patent is:

1. Apparatus for producing a reaction of lime and sucrose in the manufacture of sugar from sugar beets comprising a reaction chamber, an impeller to produce a current movement of solution in said chamber, and cooling flues extending transversely of the chamber in the path of said movement.

2. Apparatus for producing a reaction of lime and sucrose in the manufacture of sugar from sugar beets comprising a reaction chamber, an impeller to produce a current movement of solution in said chamber, and a bank of flues extending transversely of the chamber in the path of said movement, in an arrangement for circulating a cooling fluid through the flues successively from one end of the bank to another end of the same.

3. Apparatus for producing a reaction of lime and sucrose in the manufacture of sugar from sugar beets comprising a reaction chamber, an impeller to produce a current movement of solution in said chamber, and a bank of flues extending transversely of the chamber in series interconnected for the flow of a cooling fluid successively from one series to another throughout the bank.

4. Apparatus for producing a reaction of lime and sucrose in the manufacture of sugar from sugar beets comprising a reaction chamber, an impeller to produce a current movement of solution in said chamber, and a cooling element comprising passageways at opposite sides of the chamber, divided into compartments, and a system of flues extending transversely of the chamber between said passageways, the flues and the compartments being relatively arranged for the flow of a cooling fluid from a first flue of the system successively through the other flues along a zig-zag course to and through a last flue of the system.

5. Apparatus for producing a reaction of lime and sucrose in the manufacture of sugar from sugar beets comprising a reaction chamber, an impeller to produce a current movement of solution in said chamber, and a cooling element comprising passageways at opposite sides of the chamber, divided into compartments, and a system of series of flues extending transversely of the chamber between said passage-ways, said series and compartments being relatively arranged for the flow of a cooling fluid from a first series of the system successively through the other series alternately in opposite directions to and through the last series of the system.

6. Apparatus for producing a reaction of lime and sucrose in the manufacture of sugar from sugar beets comprising a reaction chamber, an impeller to produce a current movement of solution in said chamber, and rows of cooling flues extending in staggered formation across the chamber in the path of said movement.

7. Apparatus for producing a reaction of lime and sucrose in the manufacture of sugar from sugar beets comprising a reaction chamber divided to provide a vertical course for the circulating movement of a solution in the chamber, cooling flues extending across said course, and an impeller to effect the movement of the solution through the course.

8. Apparatus for producing a reaction of lime and sucrose in the manufacture of sugar from sugar beets comprising a reaction chamber divided to provide a course for the circulating movement of a solution in the chamber, cooling flues extending across said course, and an impeller to effect the movement of the solution through the course.

9. Apparatus for producing a reaction of lime and sucrose in the manufacture of sugar from sugar beets comprising a reaction chamber divided to provide a vertical course for the circulating movement of a solution in the chamber, cooling flues extending across said course, an impeller to effect the movement of the solution through the course, and an extension of the chamber above the course to admit the solution to a relatively high level.

10. Apparatus for producing a reaction of lime and sucrose in the manufacture of sugar from sugar beets comprising a reaction chamber partitioned to provide channels for the up flow of solution in the chamber and a channel for the down flow of the same, impellers to effect the up flow of solution in the first mentioned chambers and cooling flues extending across the chambers.

11. Apparatus for producing a reaction of lime and sucrose in the manufacture of sugar from sugar beets comprising an upright tank, flues extending between opposite walls thereof and connected exteriorly of the same for the movement of a cooling fluid from one to another, upright partitions dividing the tank into communicating channels, and an impeller to effect the upflow of solution in one of the channels.

12. Apparatus for producing a reaction of lime and sucrose in the manufacture of sugar from sugar beets comprising an upright tank, flues extending between opposite walls thereof and connected exteriorly of the same for the movement of a cooling fluid from one to another, upright partitions dividing the tank into communicating channels, and impellers to effect the up flow of solution in part of the channels.

13. Apparatus for producing a reaction of lime and sucrose in the manufacture of sugar from sugar beets comprising an upright tank, flues extending between opposite walls thereof and connected exteriorly of the same for the movement of a cooling fluid from one to another, upright partitions dividing the tank partially into communicating channels, there being a space for liquid above the channels, and an impeller at the lower end of one of the channels to effect the upflow of solution through the same.

14. The method of producing a reaction of lime and sucrose in the manufacture of sugar from sugar beets consisting in cooling a batch of sucrose solution and reagent while circulating in an endless course under the constant influence of an impellent force and with a pulsating velocity caused by frequent changes of direction between turns of said course.

15. The method of producing a reaction of lime and sucrose in the manufacture of sugar from sugar beets consisting in cooling a batch of sucrose solution and reagent while circulating in an endless course under the constant influence of an impellent force and subjecting the circulating mixture to frequent changes of direction in said course.

16. The method of producing a reaction of lime and sucrose in the manufacture of sugar from sugar beets consisting in cooling a batch of sucrose solution and reagent while circulating in an endless course under the constant influence of an impellent force and compelling the circulating mixture to follow a zig-zag path in said course by frequent changes of direction.

17. The method of producing a reaction of lime and sucrose in the manufacture of sugar from sugar beets, consisting in cooling a batch of sucrose solution and reagent while moving in a course under the influence of an impellent force, and with a pulsating velocity caused by a sequence of short changes of direction in said course.

18. The method of producing a reaction of lime and sucrose in the manufacture of sugar from sugar beets, consisting in cooling a batch of sucrose solution and reagent while moving in a course under the influence of an impellent force, and with a pulsating velocity caused by a sequence of short changes of direction in said course alternately in opposite directions.

19. Apparatus for producing a reaction of lime and sucrose in the manufacture of sugar from sugar beets comprising an endless course for the circulatory movement of a sucrose solution, means to effect said movement, and refrigerant baffles across said course.

20. Apparatus for producing a reaction of lime and sucrose in the manufacture of sugar from sugar beets comprising an endless course for the circulatory movement of a sucrose solution, means to effect said movement, and refrigerant baffles across said course in staggered arrangement.

In testimony whereof we have affixed our signatures.

RALPH W. SHAFOR.
EDWIN MORRISON.
ROBERT J. BROWN.
LAURENCE A. STENGER.
ALPHEUS R. NEES.